(12) United States Patent
Kono et al.

(10) Patent No.: US 6,448,762 B1
(45) Date of Patent: Sep. 10, 2002

(54) ROTATION-ANGLE-DETECTION DEVICE HAVING MAGNETIC SENSOR FIXED TO COVER WITH DETECTION DIRECTION TRANSVERSE TO COVER LONGITUDINAL DIRECTION

(75) Inventors: Yoshiyuki Kono, Obu (JP); Takashi Hamaoka, Kariya (JP); Takamitsu Kubota, Kariya (JP); Katsuya Torii, Anjo (JP); Kunio Tanaka, Nagoya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/694,564

(22) Filed: Oct. 24, 2000

(30) Foreign Application Priority Data

Nov. 1, 1999 (JP) .............................. 11-311190
Jan. 28, 2000 (JP) ........................ 2000-024724

(51) Int. Cl.[7] .............................. G01B 7/30; G01R 33/07
(52) U.S. Cl. .............................. 324/207.2; 324/207.25; 123/617
(58) Field of Search .................... 324/207.2, 207.21, 324/207.25, 174, 251, 252; 123/617; 338/32 R, 327

(56) References Cited

U.S. PATENT DOCUMENTS

| 5,444,369 A | * | 8/1995 | Luetzow .................. 324/207.2 |
| 5,698,778 A | * | 12/1997 | Ban et al. .................. 73/118.1 |
| 5,757,179 A | * | 5/1998 | McCurley et al. ........ 324/207.2 |
| 5,789,917 A | * | 8/1998 | Oudet et al. ............. 324/207.2 |

FOREIGN PATENT DOCUMENTS

| JP | 62-182449 | 8/1987 |
| JP | 2-130403 | 5/1990 |
| JP | 8-68606 | 3/1996 |

* cited by examiner

*Primary Examiner*—Edward Lefkowitz
*Assistant Examiner*—Reena Aurora
(74) *Attorney, Agent, or Firm*—Nixon & Vanderhye PC

(57) ABSTRACT

A rotation-angle-detection device includes a main housing, a resinous cover for covering an opening of the main housing, a permanent magnet disposed at the main housing to be rotatable in response to rotation of a throttle valve, and a magnetic sensor. The cover is longer in longitudinal direction than in lateral direction, and the magnetic sensor is fixed to the resinous cover. The magnetic sensor is disposed so that the detection direction and the longitudinal direction of the cover cross each other at a right angle.

7 Claims, 8 Drawing Sheets

ROTATION-ANGLE-DETECTION DEVICE HAVING MAGNETIC SENSOR FIXED TO COVER WITH DETECTION DIRECTION TRANSVERSE TO COVER LONGITUDINAL DIRECTION

CROSS REFERENCE TO RELATED APPLICATION

The present application is based on and claims priority from Japanese Patent Applications: Hei 11-311190, filed Nov. 1, 1999; and 2000-24724, filed Jan. 28, 2000, the contents of which are incorporated herein by reference.

BACKGROUND OF THE INVENTION

1. Field of the Invention

The present invention relates to a rotation-angle-detection device for detecting an object to be detected by a magnetic sensor and a permanent magnet.

2. Description of the Related Art

In an electronically controlled throttle system, a rotary shaft of throttle valve is rotatably supported by an aluminum throttle body. The throttle valve is rotated by a rotary shaft, which is rotated by a motor, mounted on the throttle body, via a speed reduction unit. The rotary shaft is linked with a rotation-angle-detection device. The rotation-angle-detection device includes a rotor core, a permanent magnet that is fixed to the inner periphery of the rotor core, and a stator core. The stator core is molded into a resinous cover that covers an opening portion of the throttle body. The stator core is disposed inside rotor core to be coaxial therewith so that the inner periphery of permanent magnet is opposed to the outer periphery of stator core. A magnetic detection gap is formed in the stator core to penetrate the same in a radial direction to hold a Hall IC therein.

When magnetic flux of permanent magnet passes the stator core and the magnetic gap, the output signal of the Hall IC changes as the flux density changes. Because the flux density of the flux passing the magnetic detection gap changes as the permanent magnet rotates, it is possible to detect the rotation angle of permanent magnet by the Hall IC, and, in turn, the rotation angle (throttle open angle) of the throttle valve.

The cover extends longer in the longitudinal direction than the lateral direction so as to cover the motor and the speed reduction unit, and, accordingly, the resinous cover has a much larger thermal expansion coefficient than the metal-made throttle body. In addition, the detection direction of the Hall IC and the longitudinal direction of cover are parallel to each other.

If the cover thermally deforms, the magnetic detection gap and an air gap between stator core and permanent magnet changes, and the flux density of the flux passing the magnetic detection gap changes. As a result, the output voltage of the Hall IC may change and can not detect the rotation angle at a high accuracy.

Conventionally, an output error due to the temperature characteristics of a magnetic sensor is corrected by a temperature compensation element. However, it is very difficult to correct such an output error completely because of variation in characteristics of the magnetic sensors and the temperature compensation elements.

Further, if the resinous cover is made of a mere resinous mold, the resinous cover may warp or deform while throttle position sensor is put into use or manufactured. As a result, the Hall element and permanent magnet, which are disposed at resinous cover, may shift from each other, and the open angle of the throttle valve can not be detected accurately.

SUMMARY OF THE INVENTION

Therefore, an object of the invention is to provide a rotation-angle-detection device that can reduce fluctuation of the output signal of the magnetic sensor due to thermal deformation thereof, thereby improving the accuracy of the rotation position of an object to be detected.

According to an aspect of the invention, magnetic sensor is disposed so that the magnet-detecting direction and the longitudinal direction of the cover cross each other at a right angle. Therefore, the detection direction of the magnetic sensor is the same direction as the shorter side direction of the cover so that the distance change in the detection direction due to the thermal deformation of the cover can be reduced.

This reduces the change in the flux density in the detection direction, and the fluctuation of the output signal due to thermal deformation of the cover can be reduced. As a result, the detection accuracy of the rotation angle can be improved.

According to another aspect of the invention, a permanent magnet is fixed to a cylindrical rotor core rotating in response to the object to be detected. A stator core is disposed inside the rotor core to be coaxial therewith and is molded into the resinous cover. The magnetic sensor is fixed to a magnetic detection gap formed in the stator core to penetrate the stator core in a radial direction.

It is preferable that the detection direction of the magnetic sensor crosses the longitudinal direction of the cover at a right angle. In other words, the detection direction is in the same direction as the shorter side of the cover. Therefore, the change in size of the portion in the detection direction can be reduced, and the deformation of the magnetic detection gap, and the air gap between the stator core and the permanent magnet can be reduced.

In the meantime, the accuracy of the rotation-angle-detection device using a magnetic sensor is the best where the output signal of the magnetic sensor becomes zero. Because, the position where the output signal of the magnetic sensor becomes zero is the center of the straight portion of the output, which is excellent in linearity. In addition, the temperature does not affect the magnetic sensor at such a condition.

In view of the above characteristic, the permanent magnet and the magnetic sensor are disposed so that the output signal of the magnetic sensor becomes zero at an angle to be detected at a highest accuracy or its vicinity. Accordingly, the temperature influence on the magnetic sensor can be minimized in the rotation angle where a highest accuracy is required, so that the accuracy of the rotation angle can be improved.

The permanent magnet and the magnetic sensor can be disposed so that the output signal of the magnetic sensor becomes zero at a basic rotation angle, such as the position where the throttle valve is fully closed, of the object or its vicinity. Therefore, it is possible to minimize the influence of the temperature at a basic rotation angle of the object or its vicinity. Because the basic rotation angle can be detected at a high accuracy, it is possible to adjust the output signal of the magnetic sensor on the basis of the basic rotation angle, so that the accuracy of the rotation angle can be improved.

Another object of the invention is to provide an air intake control system in which a resinous mold having a simple structure made of heat-resistant reinforcing material is adopted so that the open angle of a throttle valve can be accurately detected.

According to another aspect of the invention, a heat resistant reinforcing member is provided to reinforce a resinous mold that accommodates a detecting element therein.

As a result, the resinous mold can be used under a high temperature condition without any problem, so that the detecting element can accurately detect the open angle of the throttle valve. In addition, the heat-resistant reinforcing member makes the resinous mold heat-resistant at a low cost.

The resinous mold may have a fixture member for fixing an external connection terminal for connecting the detecting element to the outside, and the heat-resistant reinforcing member is fixed to the fixture member in a unit. Therefore, heat problem of the fixture member can be prevented even if it is used under a high temperature condition.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
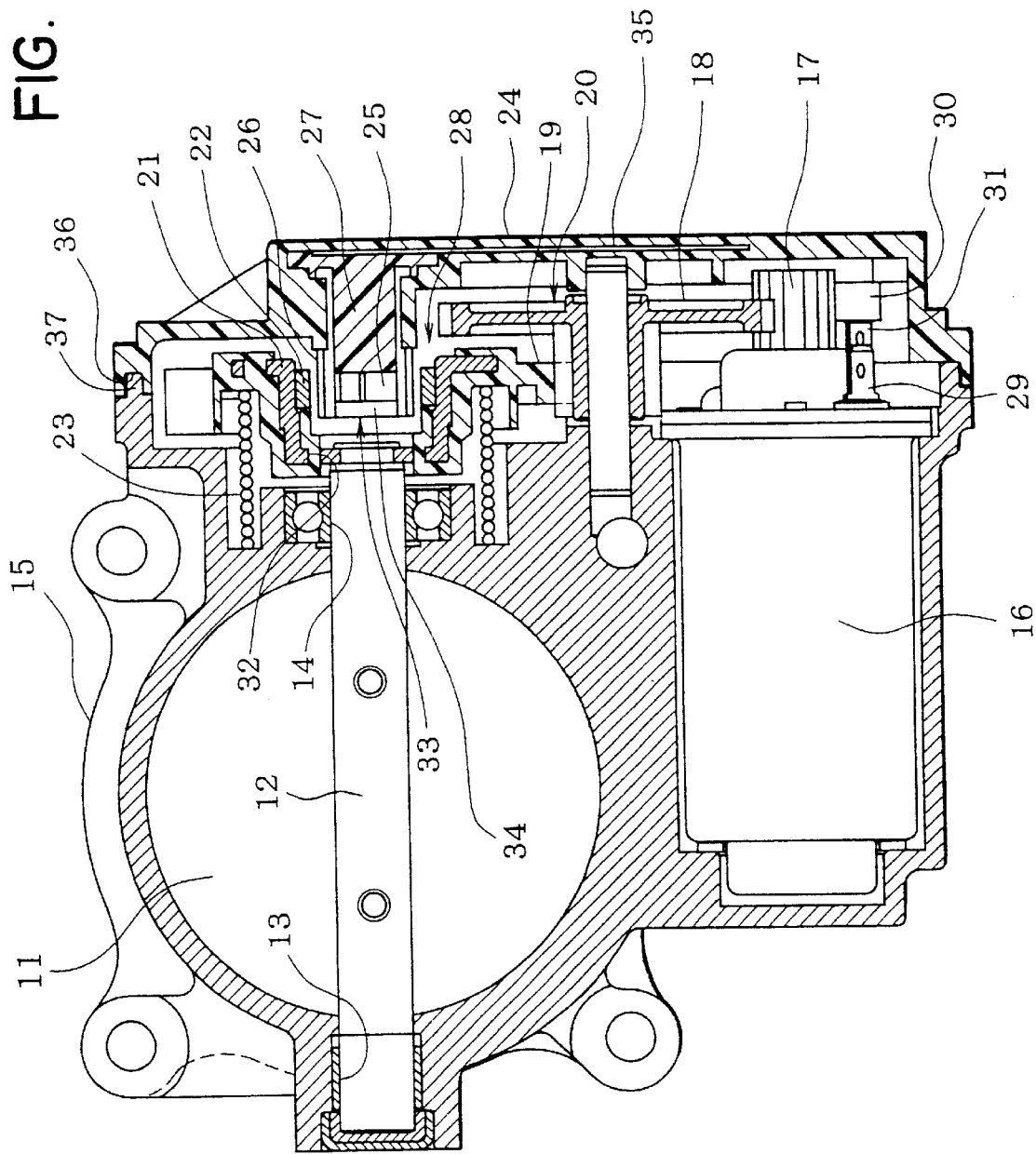
FIG. 1 is an axial cross-sectional view of an electronically controlled throttle system according to a first embodiment of the invention.

An electronically controlled throttle system according to a first embodiment is described with reference to FIGS. 1–6.

An electronically controlled throttle system is described with reference to FIG. 1, first. Throttle valve 11, which is an object to be detected in this invention, is fixed to rotary shaft 12. Throttle valve 11 controls intake air of an internal combustion engine. Rotary shaft 12 is supported by aluminum throttle body 15 via bearings 13 and 14. Throttle body 15 corresponds to a main housing in this invention. Motor 16 is mounted in a lower portion of throttle body 15 to drive throttle valve 11. The rotation speed of motor 16 is reduced by speed reduction unit 20 and is transmitted to rotary shaft 12 to rotate throttle valve 11.

Gear 19 is fixed to rotary shaft 12 of throttle valve 11. Gear 19 is formed of resin mold with cup-shaped rotor core 21 and permanent magnet 22 being inserted. Thus, gear 19, rotor core 21 and permanent magnet 22 are integrated and fixed to an end of rotary shaft 12 by a caulked joint or the like. Gear 19 is biased by torsion coil spring 23 in a rotation direction so that throttle valve 11 can automatically return to a fully closed position.

Figure 2:
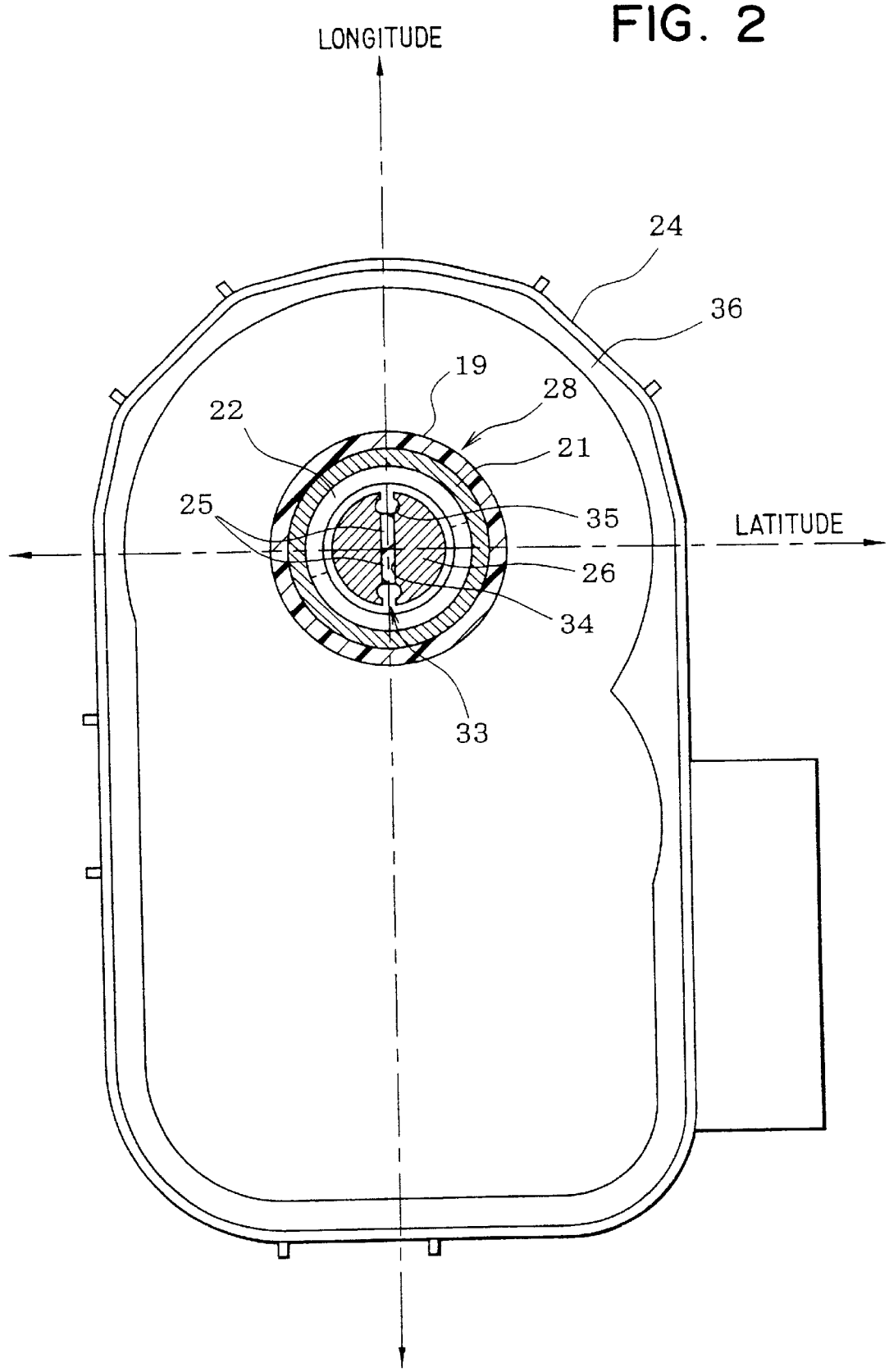
FIG. 2 is a cross-sectional front view of a rotation-angle-detection device mounted in a cover of the electronically controlled throttle system.

Resinous cover 24 covers right opening portion of throttle body 15. Resinous cover 24 is formed into a member that is longer in longitudinal direction than in lateral direction, as shown in FIG. 2, so as to cover motor 16 and speed reduction unit 20, which are disposed at the lower portion of throttle body 15. Stator core 26 has Hall IC 25 therein. Stator core 26 and spacer 27 are molded together at the upper inside of cover 24. Cover 24 is fastened to throttle body 15 by bolts or the like so that stator core 26 and Hall IC 25 can be fixed.

Accordingly, rotation-angle-detection device 28, which includes rotor core 21, permanent magnet 22, stator core 26, and Hall IC 25, is accommodated into the space inside cover 24. Connector housing 30 for connecting motor terminal 29 is integrated with a lower inside of cover 24. connector housing includes connector pin 31 that is connected to motor terminal 29.

Figure 3:
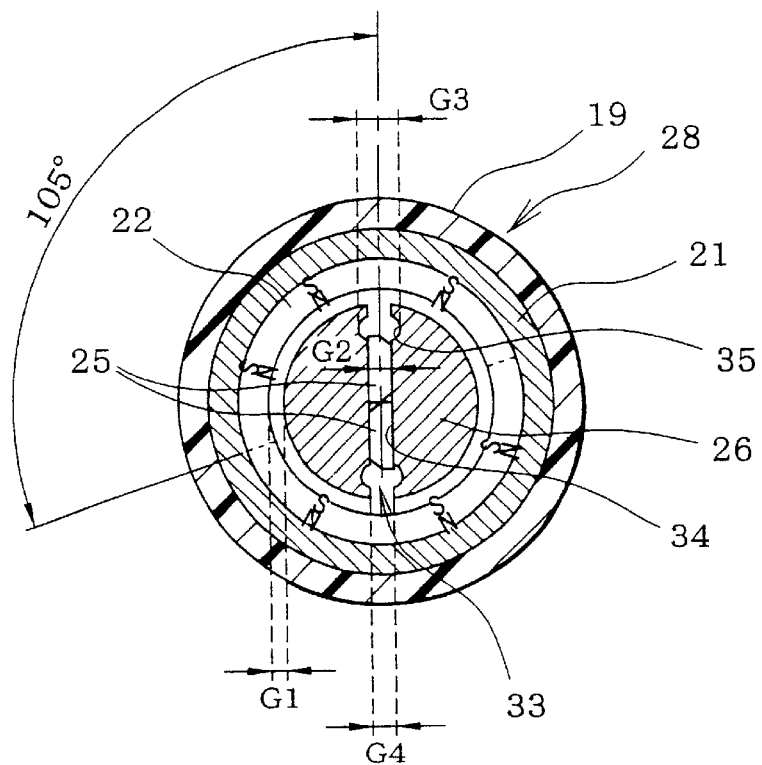
FIG. 3 is a fragmentary cross-sectional front view illustrating a main portion of the rotation-angle-detection device when a throttle valve is fully closed.

Rotor core 21 and stator core 26 are made of a magnetic material such as iron. As shown in FIG. 3, stator core 26 is disposed inside rotor core 21 to be coaxial with rotor core 21. Permanent magnet 22 is fixed to the inner periphery of rotor core 21 to be coaxial therewith so that a uniform air gap G1 can be formed between the inner periphery of permanent magnet 22 and the outer periphery of stator core 26. Permanent magnet 22 is polarized so that the lines of magnetic force of the permanent magnet can be oriented to radial directions. The upper half of permanent magnet 22 is magnetized so that the inner periphery thereof is polarized to be North and the outer periphery is polarized to be South. The lower half of permanent magnet 22 is magnetized so that the outer periphery thereof is polarized to be North and the inner periphery is polarized to be South. It is possible to divide permanent magnet 22 into two pieces that jointly form a cylindrical permanent magnet. It is also possible to magnetize permanent magnet 22 so that the lines of magnetic force are parallel to each other.

A plurality of through holes 32 is formed around rotary shaft 12 at the left side of rotor core 21 to prevent magnetic short-circuit.

Stator core 26 is divided into a left half and a right half, which are held by spacer 27, as shown in FIG. 1, to form radially penetrating gap 33. Magnetic detection gap 34 is formed at the center of gap 33, as shown in FIG. 2. Magnetic detection gap 34 has a suitable gap G2 and extends in parallel with the longitudinal direction of cover 24 to provide a parallel magnetic field. Large gap 35 having arc-shaped recess on opposite sides (upper and lower sides of stator core 26 in FIG. 3) is formed at opposite ends of magnetic detection gap 34. Gap G3 of large gap 35 is larger than gap G2 of magnetic detection gap 34. Thus, the magnetic fluxes passing stator core 26 are gathered in magnetic detection gap 34. The arc-shape portions of large gap 35 reduces the outer portion of gap G4, so that the magnetic flux can be supplied from permanent magnet 22 to stator core 26 as much as possible. The outer portion of gap G4 is formed to be larger than air gap G1 between permanent magnet 22 and stator 26 so that magnetic short-circuit through gap G4 can be prevented. Large gap 35 is not always necessary, however.

A pair of Hall ICs 25 is disposed in magnetic detection gap 34 so that the magnetic flux passing magnetic detection gap 34 can cross the pair at a right angle. Each Hall IC 25 is an integrated circuit into which a Hall element and a signal amplifier are integrated to provide a voltage signal corresponding to the flux density of the flux passing magnetic detection gap 34 (flux density of the flux interlinking the Hall IC 25). Each Hall IC 25 is disposed so that the magnetic-flux-detection direction and the longitudinal direction of cover 24 cross each other at a right angle, as shown in FIG. 2.

Each Hall IC 25 can have a function such as out-putgain-adjustment according to the flux density, off-set adjustment, electric-trimming temperature-compensation, or a self diagnosis for detecting wire-breakage or a short-circuit. Spacer 27 positions each Hall IC 25, and the terminal (not shown) thereof is extended through the inside of spacer 27 to connected to connector pin 35 by welding or the like. Connector pin 35 connects Hall IC 25 to a control circuit (not shown).

As shown in FIG. 1, arc-shaped concave portion 36 is formed on the upper edge portion of cover 24 to be coaxial with stator core 26. Because arc-shaped concave portion 36 is fitted to convex portion 37 that is formed in the upper opening portion of throttle body 15, rotor core 21 and stator core 26 are disposed to be accurately coaxial.

As shown in FIG. 3, there is a pair of neutral boundaries, as indicated by broken lines, between the magnetic poles of permanent magnet 22. If the pair of neutral boundaries becomes parallel with magnetic detection gap 34 (hereinafter referred to as rotor's rotation angle being 0°), the following magnetic circuit is formed. The magnetic circuit starts from a side of permanent magnet 22 with regard to the neutral boundary, the same side of stator core 26, magnetic detection gap 34, the other side of stator core 26, the other side of permanent magnet 22, and rotor core 21 to the same side of permanent magnet 22. Accordingly, the flux of permanent magnet 22 flows from one side of stator core 26 to the other side (hereinafter referred to the positive direction). When rotor core 21 rotates as the throttle valve rotates, a portion of the magnetic flux flows from the other side of stator core 26 to the one side (hereinafter referred to as the negative direction) to counteract the magnetic flux flowing in the positive direction in magnetic detection gap 34. As a result, a difference ($\Phi1 - \Phi2$) between magnetic flux $\Phi1$ flowing in the positive direction and magnetic flux $\Phi2$ flowing in the negative direction flows in magnetic detection gap 34.

Figure 5:
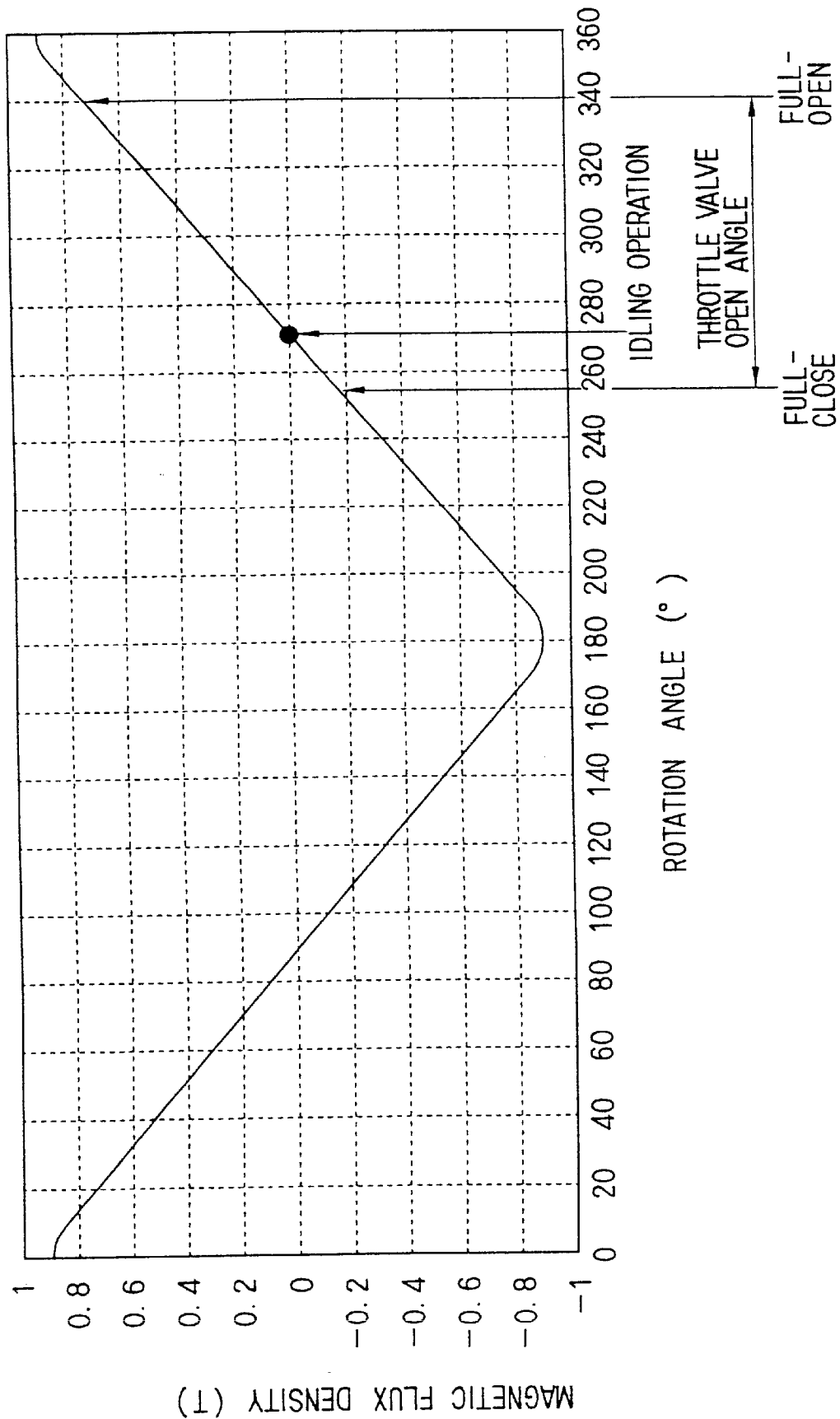
FIG. 5 is a graph showing a characteristic curve of magnetic flux in a magnetic detection gap density relative to rotation angles of a rotor shown in FIG. 1.

If the rotation angle of rotor core 21 falls between 0 and 180°, positive magnetic flux $\Phi1$ reduces while negative magnetic flux $\Phi2$ increases in response to the rotation angle. As shown in FIG. 5, in the region of the rotation angle between 0° and 180°, the magnetic flux density passing magnetic detection gap 34 decreases in response to increase of the rotation angle. At the rotation angle of 90°, positive magnetic flux $\Phi1$ and negative magnetic flux $\Phi2$ become equal to each other, so that the magnetic flux density in magnetic detection gap 34 becomes 0. If the rotation angle falls between 180° and 360°, positive magnetic flux $\Phi1$ increases and negative magnetic flux decreases. Therefore, the slope of the change of the magnetic flux density is different from the slope change of the magnetic flux density where the rotation angle is between 0° and 180°. Consequently, the magnetic flux density becomes 0 in magnetic detection gap where the rotation angle is 270°.

Thus, as rotor core 21 rotates, the magnetic flux density (the density of the magnetic flux interlinking Hall IC 25) passing magnetic detection gap 34 of stator core 26 changes so that the output signal of Hall IC 25 changes in response to the magnetic flux density. A control circuit (not shown) reads the output signal of Hall IC 25 and detects the rotation angle of rotor core 21 (the rotation angle of throttle valve 11). While the rotation angle is detected, the output signals of the pair of Hall ICs 25 are compared with each other to find out any failure thereof.

The rotation angle of rotor core 21 is positioned at 270° so that the output voltage of Hall IC 25 is set to zero while engine runs at an idling speed with a throttle open angle being about 15°, as shown in FIG. 5. The throttle open angle at the idling speed is a almost fully-closed-angle of throttle valve 11 to be detected at the best accuracy. If the rotation region from the fully open position to the fully closed position is 85°, the rotation region of throttle valve 11 corresponds to the region between 255° and 340°.

Figure 4:
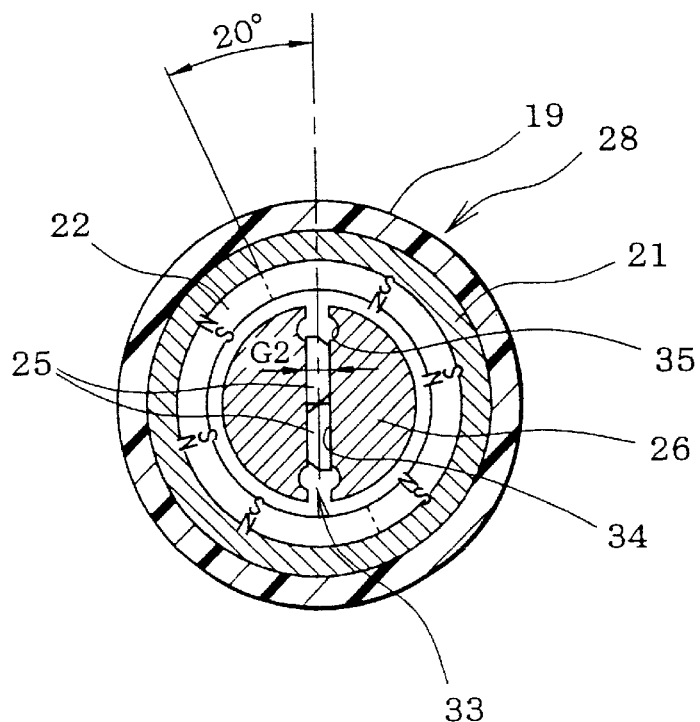
FIG. 4 is a fragmentary cross-sectional front view illustrating a main portion of the rotation-angle-detection device when the throttle valve is fully open.

As shown in FIG. 3, the neutral boundary of permanent magnet 22 is positioned 105° counterclockwise (255° clockwise) from magnetic detection gap 34 at the fully closed position (the rotation angle of rotor core 21 is 255°) of throttle valve 11. On the other hand, as shown in FIG. 4, the neutral boundary of permanent magnet 22 is positioned 20° counterclockwise (340° clockwise) from magnetic detection gap 34 at the fully open position (the rotation angle of rotor core 21 is 340°) of throttle valve 11.

It is also possible to set the rotation region of throttle valve 11 to correspond to the region between 75° and 160° of the rotation angle of rotor core 21, so that the output voltage of Hall IC 25 becomes zero (the rotation angle of rotor core 21 is 90°) at the engine-idling-throttle-open-angle of 15°.

Resinous cover 24 holds stator core 26 therein, and stator core holds Hall IC 25 therein. Resinous cover 24 has a larger thermal expansion coefficient than metal-made throttle body 15. Because cover 24 is shaped long enough to cover motor 16 and speed reduction unit 20, which are disposed at lower portions of throttle body, the amount of thermal deformation in the longitudinal direction becomes large.

Magnetic detection gap 34 of stator core 26 is extended along the longitudinal direction of cover 24 so that the detection direction of Hall IC 25 and the longitudinal direction of cover 24 can cross each other at a right angle. Therefore, the magnetic detection direction of Hall IC 25 becomes parallel to the shorter side (horizontal direction in FIG. 2) of cover 24 so that dimensional change in the magnetic detection direction due to thermal deformation of cover 24 can be reduced. Accordingly, the shift of stator core 26 in the magnetic detection direction can be reduced. Therefore, the change in the magnetic detection gap 34 and the gap between stator core 26 and permanent magnet 22 can be reduced so that the fluctuation of the magnetic flux density of the flux passing the magnetic detection gap 34 can be reduced.

Figure 6A:
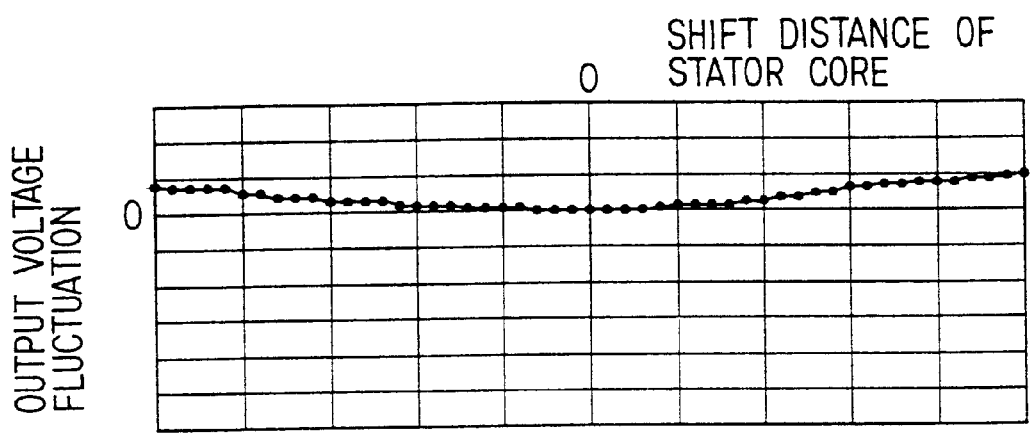
FIG. 6A is an output characteristic curve of a Hall IC shown in FIG. 1 when the stator core shifts to a right angle to the magnetic detection direction of the Hall IC.
Figure 6B:
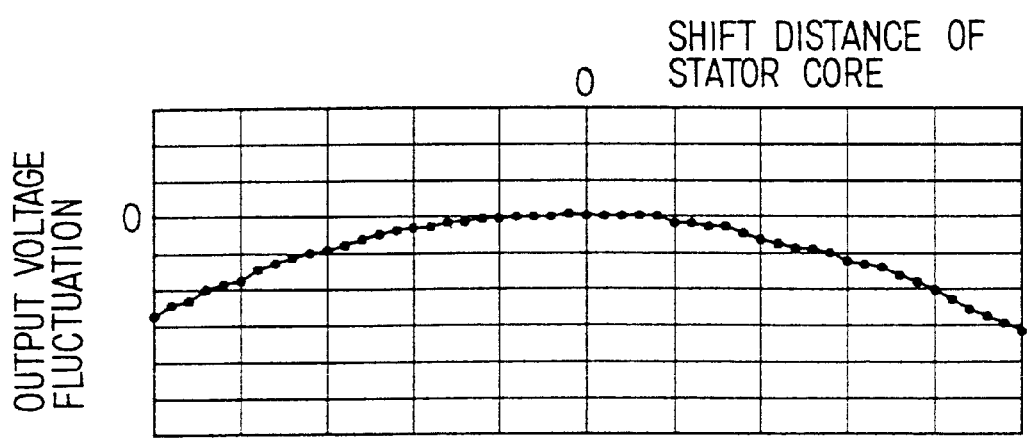
FIG. 6B is an output voltage characteristic curve of a Hall IC when the stator core shifts to the magnetic detection direction of the Hall IC.

Output fluctuations of Hall IC 25 when stator core 26 shifts from permanent magnet 22 (rotor core 21) in the direction perpendicular to the magnetic detection direction of Hall IC 25 is shown in FIG. 6A, and output fluctuations of Hall IC 25 when stator core 26 shifts from permanent magnet 22 (rotor core 21) in the direction parallel to the magnetic detection direction of Hall IC 25 is shown in FIG. 6B. It was found that the amount of the output fluctuation of Hall IC 25 caused when stator core 26 shifts in the direction parallel to the magnetic detection direction was smaller than the amount of output fluctuations of Hall IC 25 when stator core 26 shifts in the direction perpendicular to the magnetic detection direction.

The accuracy of the rotation-angle-detection device using a magnetic sensor such as a Hall IC is the best where the output voltage of the magnetic sensor is nearly zero. The position where the output voltage becomes zero is the center of the linear region of the output voltage curve having the best linearity. If the output voltage of the magnetic sensor is zero, the temperature characteristics of the magnetic sensor do not affect the output voltage thereof.

Generally, the throttle valve open angle whose accuracy is most required is the angle of the throttle valve while an engine operates at an idling speed, where the throttle valve is almost fully closed.

The throttle valve open angle 15° in the idling operation can be changed to any other suitable angle.

Figure 7:
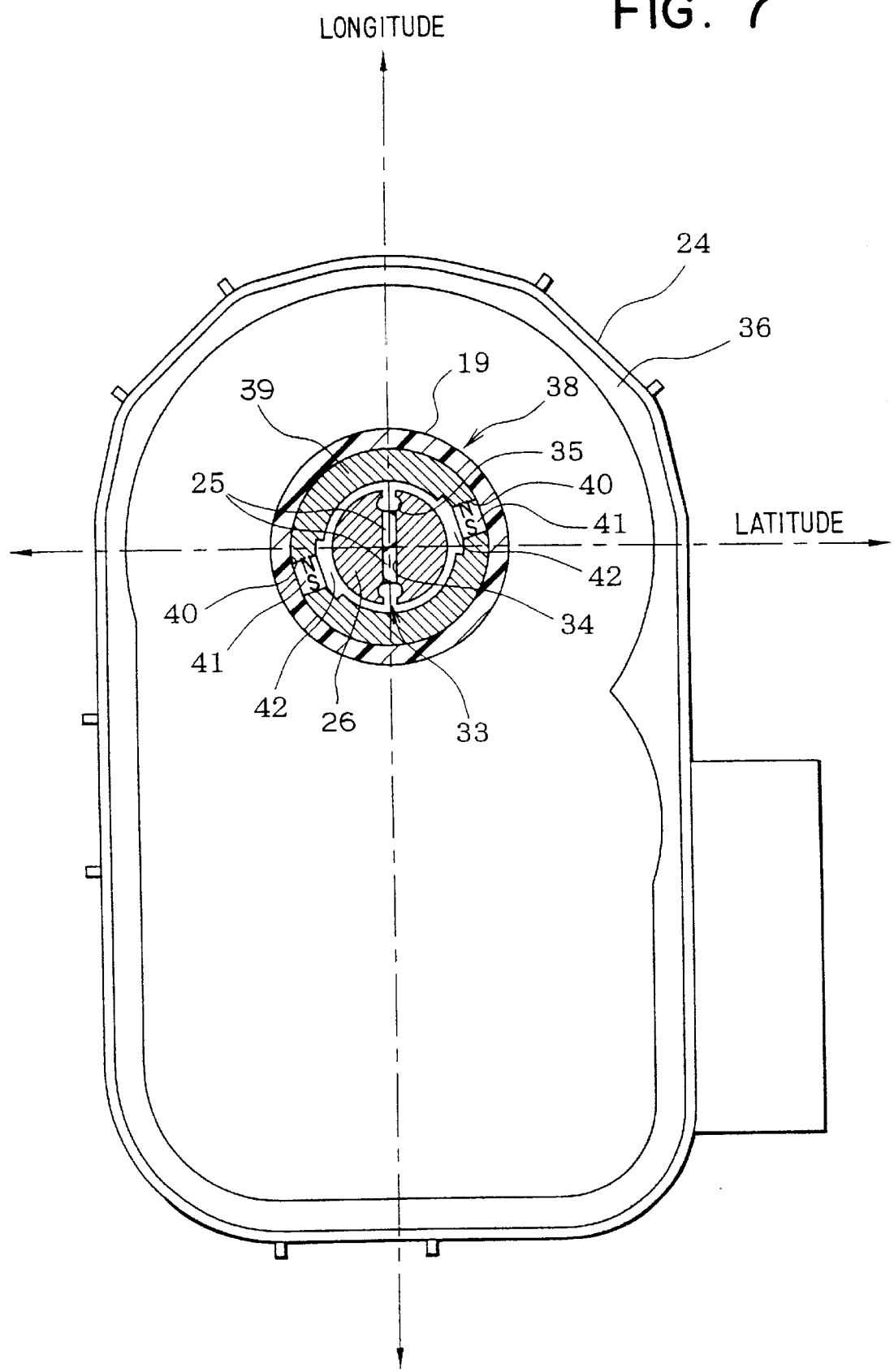
FIG. 7 is a cross-sectional front view of a rotation-angle-detection device for an electronically controlled throttle system according to a second embodiment of the invention.

A rotation-angle-detection device according to a second embodiment is described with reference to FIG. 7.

The portions substantially the same as that of embodiment 1 is denoted by the same reference numeral.

Rotation-angle-detection device 38 is comprised of rotor core 39 having a pair of cuts 40 formed at radially opposite portions thereof and a pair of permanent magnets 41 respectively inserted into cuts 40 and held therein by an adhesive or the like. Each permanent magnet 41 is flat and magnetized so that N-pole and S-pole thereof are parallel to those of the other. One of permanent magnets 41 is magnetically opposed to the other via arc-shaped portion of rotor core 39 so that the magnetic flux of the one permanent magnet 41 opposes the magnetic flux of the other permanent magnet in rotor core 39. Rotor core 39 has an inner periphery facing the outer periphery of stator core 26 at a small air gap except for portions around permanent magnets 41. Therefore, the magnetic flux flowing from N-pole of each permanent magnet 41 through the inside of rotor core 39, stator core 26 and the inside of rotor core 39 and returns to S-pole of permanent magnet 41. Air gaps 42 are also formed between each permanent magnet 41 and stator core 26 to prevent short-circuit of the magnetic flux.

The rotation position of permanent magnets 41 relative to magnetic detection gap 34 (Hall IC 25) is set so that the output voltage of Hall IC 25 can be zero (the rotation angle of rotor core 39 is 270°), where the accuracy of the throttle valve open angle is most required.

Magnetic detection gap 34 of stator core 26 is formed to extend in the longitudinal direction of cover 24 so that the magnetic detection direction of Hall IC 25 and the longitudinal direction of cover 24 can cross each other at a right angle. Therefore, the output voltage fluctuation of Hall IC 25 due to thermal deformation can be suppressed, as described in the description of the first embodiment, thereby improving the detection accuracy of the throttle valve open angle.

Because a pair of permanent magnets 41 is disposed at radially opposite portions of rotor core 39 to magnetically oppose to each other, the magnetic flux can flow from N-pole of each permanent magnet 41 through the inside of rotor core 39, stator core 26, and magnetic detection gap 34 (Hall IC 25).

Therefore, it is not necessary to form an air gap between a pole surface of permanent magnets 41 and stator core 26.

Accordingly, the shape of permanent magnets 41 can be made flat, which is easy to manufacture and to magnetize. In addition, output error of Hall IC 25 due to dispersion in manufacture thereof can be reduced. This improves the detection accuracy of the rotation angle. Further, permanent magnet 41 is disposed anywhere in a passage of the magnetic flux flowing into rotor core 39.

As a variation, it is possible to provide a structure in which the output voltage of Hall IC 25 becomes zero at a basic position or a basic rotation angle, such as the throttle fully closed position or its vicinity.

However, the throttle valve open angle can be changed to a position where the output voltage of Hall IC 25 becomes zero, taking the rotation angle of the throttle valve of the electronically controlled throttle system and the linearity of the output voltage of Hall IC 25 into account.

The present invention can be applied to a rotation-angle-detection device having no stator core. The rotation-angle-detection device can be applied to any thing other than that detecting throttle valve open angle.

Figure 8:
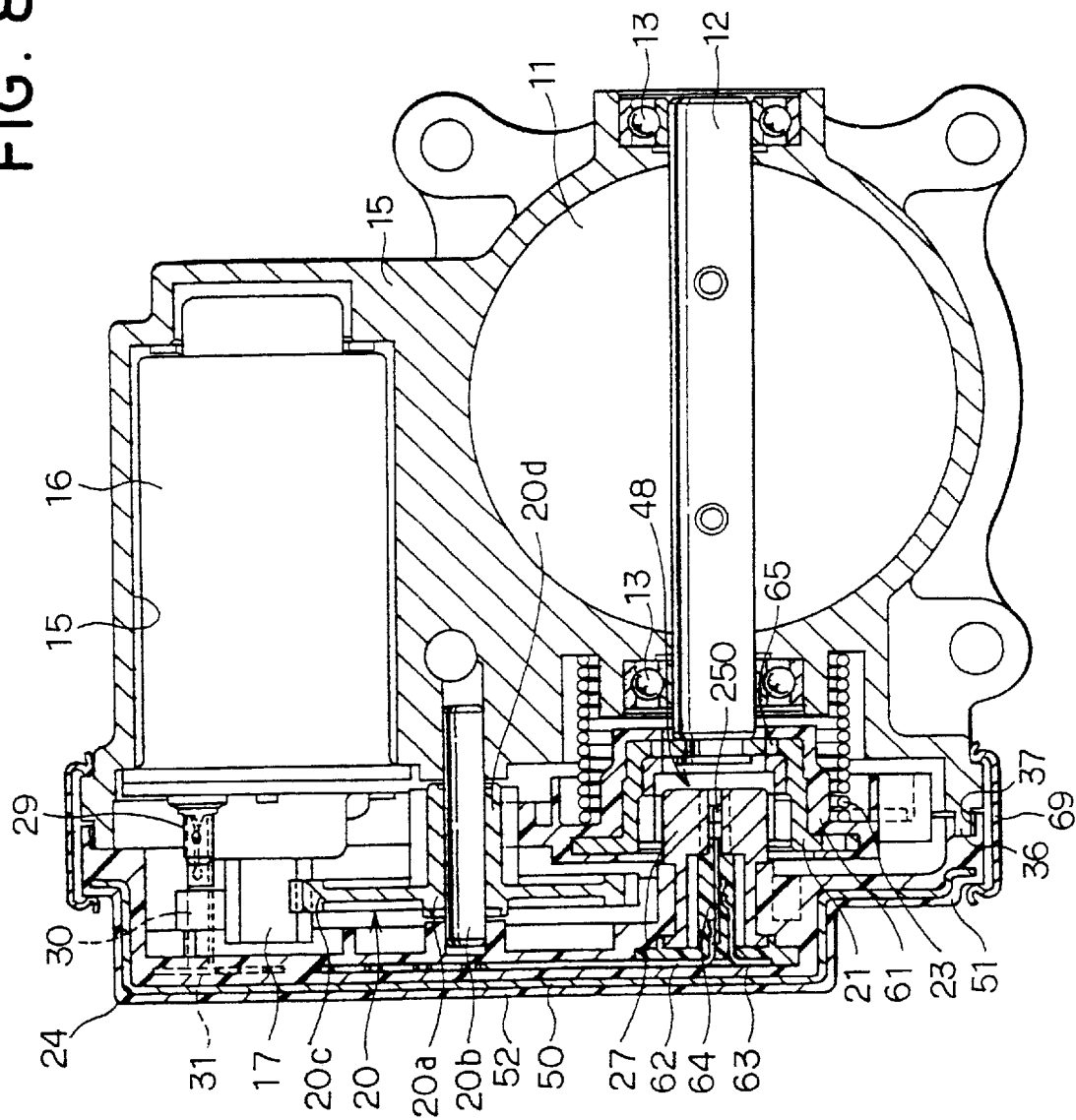
FIG. 8 is an axial cross-sectional side view of a rotation-angle-detection device according to a third embodiment of the invention.
Figure 9:
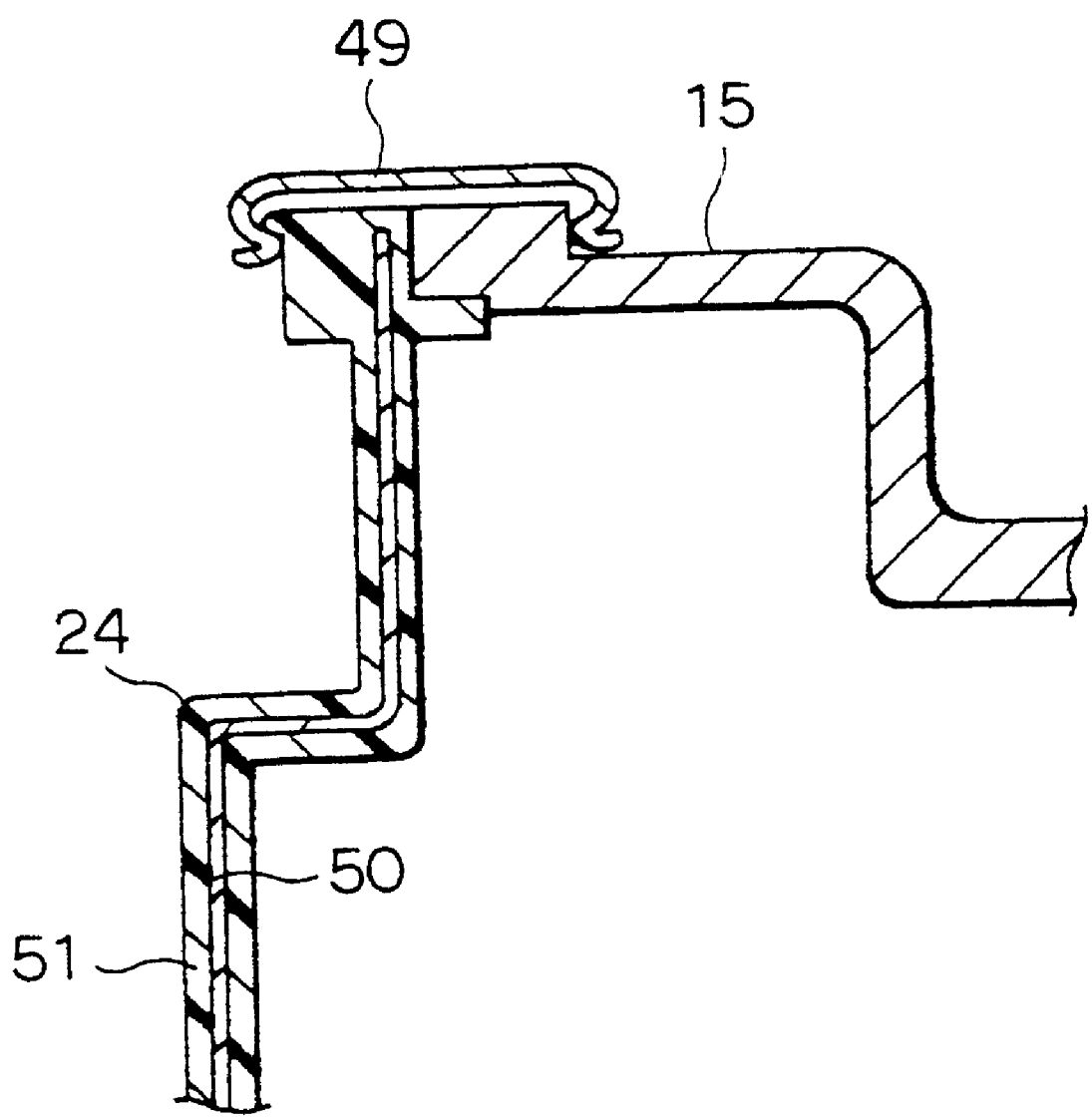
FIG. 9 is a fragmentary cross-sectional view of a main portion of the cover shown in FIG. 8.

A rotation-angle-detection device according to a third embodiment of the invention is described with reference to FIGS. 8 and 9.

An electronically controlled throttle system including the rotation-angle-detection device according to the third embodiment is comprised of throttle body 15 forming an air-intake passage leading to an internal combustion engine, throttle valve 11 rotatably supported in throttle body 15, rotary shaft 12, motor 16 for rotating this shaft 12, and engine control unit (hereinafter referred to as the ECU).

The air intake control system includes rotation-angle-detection device 48 that converts the open angle of throttle valve 11 into an electric signal (throttle-open-angle signal) and send the signal to the ECU. Throttle body 15 is fixed to an intake manifold of the engine by means of a fastening member such as a bolt.

Throttle body 15 rotatably supports an end of shaft 12 by ball bearing 13 and the other end of shaft 12 by ball bearing 13. An end of shaft 12 is force-fitted into rotor core 21, into which resinous gear 61 is insert-molded. Torsion coil spring 23 is disposed around rotor core 21 for returning throttle valve 11 and shaft 12 to an initial position when the engine operates at an idling speed.

Motor 16 is controlled by the ECU, speed reduction unit 20 is mounted between the output shaft of motor 16 and resinous gear 41. Speed reduction gear unit 20 is comprised of pinion gear 17, middle gear 20a. Pinion gear 17 is fixed to the outer periphery of the output shaft of motor 16, which mashes the large gear of middle reduction gear 20a. The small gear of middle reduction gear 20a meshes resinous gear 61.

Motor 16 is powered via motor input-terminal 31, which is buried in resinous cover 24, motor connection terminal 30 connected to motor input-terminal 31 and protruding from resinous cover 24 toward motor 16, and motor power-supply-terminal 29.

Pinion gear 17 rotates with the output shaft of motor 16.

Middle reduction gear 20a is a mold of resinous material that is rotatably fitted to the outer periphery of stationary shaft 20b. Middle gear 20a is comprised of large gear 20c formed at the peripheral portion of an end thereof and small gear 20d formed at the peripheral portion of the other end thereof.

Rotation-angle-detection device 48 is comprised of cylindrical permanent magnet 22, Hall element 250 integrated with resinous cover 24, terminals 62, 63 made of conductive thin plates and stator core 26 made of a iron-alloy metal which attracts magnetic fluxes leading to Hall element 250.

Permanent magnet 22 is fixed to the inner surface of rotor core 21, which is made of iron alloy metal (magnetic material), by means of an adhesive and the like and rotates together with throttle valve 11 and shaft 12. Permanent magnet 22 may be molded with the inner surface of rotor core 21.

Permanent magnet 22 is comprised of a half-circular portion polarized in a radial direction (with N-poled inner surface and S-poled outer surface) and the other half circular portion polarized in the other radial direction (with S-poled inner surface and N-poled outer surface). Rotor core 21 has positioning hole 64 for positioning the same at a position on shaft 12 corresponding to the idling position of throttle valve 11.

Hall element 250 is disposed opposite the inner surface of permanent magnet 22. If N-pole or S-pole appears on the sensor surface, it generates an electromotive force (If N-pole appears, a positive potential is generated. If S-pole appears, a negative potential is generated).

The connection portion of Hall element 250 and terminals 62, 63 are covered by connect holder 64 made of thermoplastic resin such as PBT. Each of two pieces of stator core 26 is fitted and fixed to the outer periphery of connect holder 64.

Resinous cover 24 closes the open side of throttle body 15. Resinous cover 24 is a resinous mold of thermoplastic resin for insulating the respective terminals of rotation-angle-detection device 48, which is light, easy to mold and inexpensive, such as PBT. Resinous cover 24 has concave portion 36, to which convex portion 37 formed at the open side of throttle body 15 is fitted and fastened by generally cylindrical clip 69 at the open side thereof.

Thus, throttle body 15 and resinous cover 24 are joined together by convex portion 36 and concave portion 37 fitted together. Thus, Hall element 250 is fixed relative to permanent magnet 22.

Resinous cover 24 accommodates motor input terminal 31, terminals 62 and 63, stator core 26, connection holder 64 for holding Hall element 250, and heat-resistant reinforcing plate 50 in a unit (by such as insert-molding).

Heat resistant reinforcing plate 50 is buried in fixture portion 52 of resinous cover 24, together with motor input terminal 31, and terminals 62 and 63.

Heat-resistant reinforcing plate 50 is made of an iron alloy plate that is as thick as a thickness between 1 mm and 10 mm. It has a resin-contained clearance between motor-input terminal 31 and terminals 62 and 63 to insulate motor input terminal 31 from terminals 62 and 63.

When a driver depresses an accelerator pedal, an accelerator-open-angle signal is inputted to the ECU by the rotation-angle-detection device 48. Then, motor 16 is energized by the ECU, and the output shaft of motor 16 rotates to open throttle valve 11 at a prescribed angle. The output shaft rotates pinion gear 17 to transmit a torque to large-diameter-gear 20c of middle gear 20a.

When large-diameter-gear 20c rotates, small-diameter-gear 27 and resinous gear 61, which meshes with small-diameter-gear 20d, rotate. Consequently, rotor core 21 with insert-molded resin gear 41 rotates, thereby to rotate shaft 12 a predetermined angle. Accordingly, the angular position of throttle valve 11 is maintained at a predetermined angle.

Rotation-angle-detection device 48 detects the position of permanent magnet 22 by Hall element 250 and sends the ECU a throttle-open-angle signal via terminals 42 and 43. The ECU calculates a suitable amount of fuel according to the throttle-open-angle signal.

As a variation, a Hall IC or magnetic reluctance element can be used instead of the above-described Hall element.

It is possible to use, as reinforcing plate 50, a heat-resistant plate formed of more than two pieces. Reinforcing plate 50 is preferably made of a heat resistant metal such as an iron plate. It is preferable that the resinous mold of cover 24 has a wiring board made of a rigid metal, so that the wiring board can function as the heat-resistant reinforcing plate.

It is possible to provide an air intake control system in which a depression amount of an accelerator is mechanically transmitted to throttle valve 11 and shaft 12 to drive throttle valve 11 and shaft 12.

A plurality of pieces of permanent magnets can be used instead of one-piece cylindrical permanent magnet 22.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. A rotation-angle-detection device for detecting an open angle of a throttle valve of an air intake system at an idling operation of an engine comprising:

a throttle body having a throttle valve and an opening end on which a motor and a speed reduction unit are mounted;

an elongated resinous cover for covering said opening end and said motor and speed reduction unit, said cover having a longitudinal axis;

a magnetic cylindrical rotor core linked to said throttle valve;

a magnetic stator core having a magnetic detection gap extending through a center of said stator core in parallel with said longitudinal axis of said cover, said stator core being disposed inside said rotor core to be coaxial therewith and molded into said resinous cover, a permanent magnet fixed to said cylindrical rotor core to be rotatable in response to opening operation of said throttle valve;

a magnetic sensor having a detection direction, said magnetic sensor being fixed to said resinous cover and disposed in said magnetic detection gap so that said detection direction and said longitudinal axis of said cover cross each other at a right angle, wherein said permanent magnet is disposed so that said output signal of said magnetic sensor becomes zero when said throttle valve is positioned at said idling operation.

2. A rotation-angle-detection device for detecting a specific rotation position of a rotating object comprising:

a main housing having an opening;

an elongated resinous cover for covering said opening, said resinous cover having a longitudinal axis;

a cylindrical rotor core rotating with said rotating object;

a stator core having a magnetic detection gap extending through said stator core in parallel with said longitudinal axis of said cover, said stator core being disposed inside said rotor core to be coaxial therewith and molded into said resinous cover;

a permanent magnet fixed to said cylindrical rotor core to be rotatable in response to rotation of said rotating object;

a magnetic sensor having a detection direction, said magnetic sensor being fixed to said resinous cover and disposed in said magnetic detecting gap so that said detection direction and said longitudinal axis of said cover cross each other at a right angle; wherein said permanent magnet is disposed so that said output signal of said magnetic sensor becomes zero when said rotating object is in said specific rotation position.

3. A rotation-angle-detection device as claimed in claim 2, wherein a heat resistant reinforcing member is buried in said resinous cover for preventing said resinous cover from deforming.

4. The rotation-angle-detection device as claimed in claim 3, further comprising a resinous mold for accommodating said magnetic sensor, wherein said resinous mold has a fixture member for fixing a connection terminal for connecting said magnetic sensor to the outside, and said heat-resistant reinforcing member is fixed to said fixture member in a unit.

5. A rotation-angle-detection device as claimed in claim 2, wherein said magnetic sensor comprises a Hall IC.

6. A rotation-angle-detection device as claimed in claim 2, wherein said stator core is made of magnetic material.

7. A rotation-angle-detection device as claimed in claim 2, further comprising a spacer, wherein said stator core is divided into a first half and a second half and held by said spacer.

* * * * *